US010861043B1

United States Patent
Baker

(10) Patent No.: US 10,861,043 B1
(45) Date of Patent: Dec. 8, 2020

(54) MEDIA PROCESSING METHODS AND SYSTEMS

(71) Applicant: Scott Bradley Baker, Sherman Oaks, CA (US)

(72) Inventor: Scott Bradley Baker, Sherman Oaks, CA (US)

(*) Notice: Subject to any disclaimer, the term of this patent is extended or adjusted under 35 U.S.C. 154(b) by 426 days.

(21) Appl. No.: 15/727,391

(22) Filed: Oct. 6, 2017

Related U.S. Application Data

(63) Continuation-in-part of application No. 15/608,896, filed on May 30, 2017, now abandoned.

(60) Provisional application No. 62/392,394, filed on May 31, 2016.

(51) Int. Cl.
| | |
|---|---|
| *G06Q 30/02* | (2012.01) |
| *H04L 29/06* | (2006.01) |
| *H04N 21/2668* | (2011.01) |
| *H04N 21/81* | (2011.01) |
| *H04N 21/2543* | (2011.01) |
| *H04N 21/254* | (2011.01) |

(52) U.S. Cl.
CPC ..... *G06Q 30/0246* (2013.01); *G06Q 30/0264* (2013.01); *G06Q 30/0273* (2013.01); *H04L 65/60* (2013.01); *H04N 21/2541* (2013.01); *H04N 21/2543* (2013.01); *H04N 21/2668* (2013.01); *H04N 21/812* (2013.01)

(58) Field of Classification Search
CPC ........... G06Q 30/0246; G06Q 30/0264; G06Q 30/0273; H04L 65/60; H04N 21/2668; H04N 21/2541; H04N 21/812; H04N 21/2543
See application file for complete search history.

(56) References Cited

U.S. PATENT DOCUMENTS

| 8,849,945 B1* | 9/2014 | Desjardins | G06F 16/447 709/217 |
| 9,954,929 B2* | 4/2018 | Hintermeister | H04L 65/4076 |
| 2002/0196275 A1* | 12/2002 | Willner | G06Q 30/02 715/744 |
| 2009/0327251 A1* | 12/2009 | Walmer | G06Q 30/02 |
| 2011/0295667 A1* | 12/2011 | Butler | G06Q 30/02 705/14.12 |

(Continued)

OTHER PUBLICATIONS

Krithivasan et al. "Multiplier Architectures for Media Processing." IEEE pp. 2193-2197. (Year: 2003).*

*Primary Examiner* — William A Brandenburg
*Assistant Examiner* — Christopher C Busch
(74) *Attorney, Agent, or Firm* — Colin P. Abrahams

(57) ABSTRACT

A media content processing method comprises submission of a broadcast to the computer or server of a receiving entity, which is coded in a neutral manner such that the creator and related identifying information is not identifiable for several purposes. The material is reviewed based on qualitative evaluation thereof by a plurality of independent reviewers who do not have access to the identifying information, and some of the material is selected based on the qualitative evaluation of the reviewers. The selected material is broadcast according to a predetermined schedule, and may also be placed in a content library for viewer access. Advertising is associated with the material selected during the broadcast thereof to generate revenue. The creator of the work is paid based on the revenues generated by the advertising associated with the material.

37 Claims, 1 Drawing Sheet

(56) References Cited

U.S. PATENT DOCUMENTS

| | | | |
|---|---|---|---|
| 2012/0158875 A1* | 6/2012 | Almeida | G06Q 30/02 |
| | | | 709/206 |
| 2012/0159337 A1* | 6/2012 | Travilla | G06Q 30/0631 |
| | | | 715/738 |
| 2013/0332463 A1* | 12/2013 | Roberts | H04N 21/2543 |
| | | | 707/741 |
| 2016/0189249 A1* | 6/2016 | Meyer | H04L 67/26 |
| | | | 705/14.66 |
| 2016/0378872 A1* | 12/2016 | Kersting | G06Q 10/103 |
| | | | 707/738 |
| 2017/0322947 A1* | 11/2017 | Subramanian | H04L 67/22 |

* cited by examiner

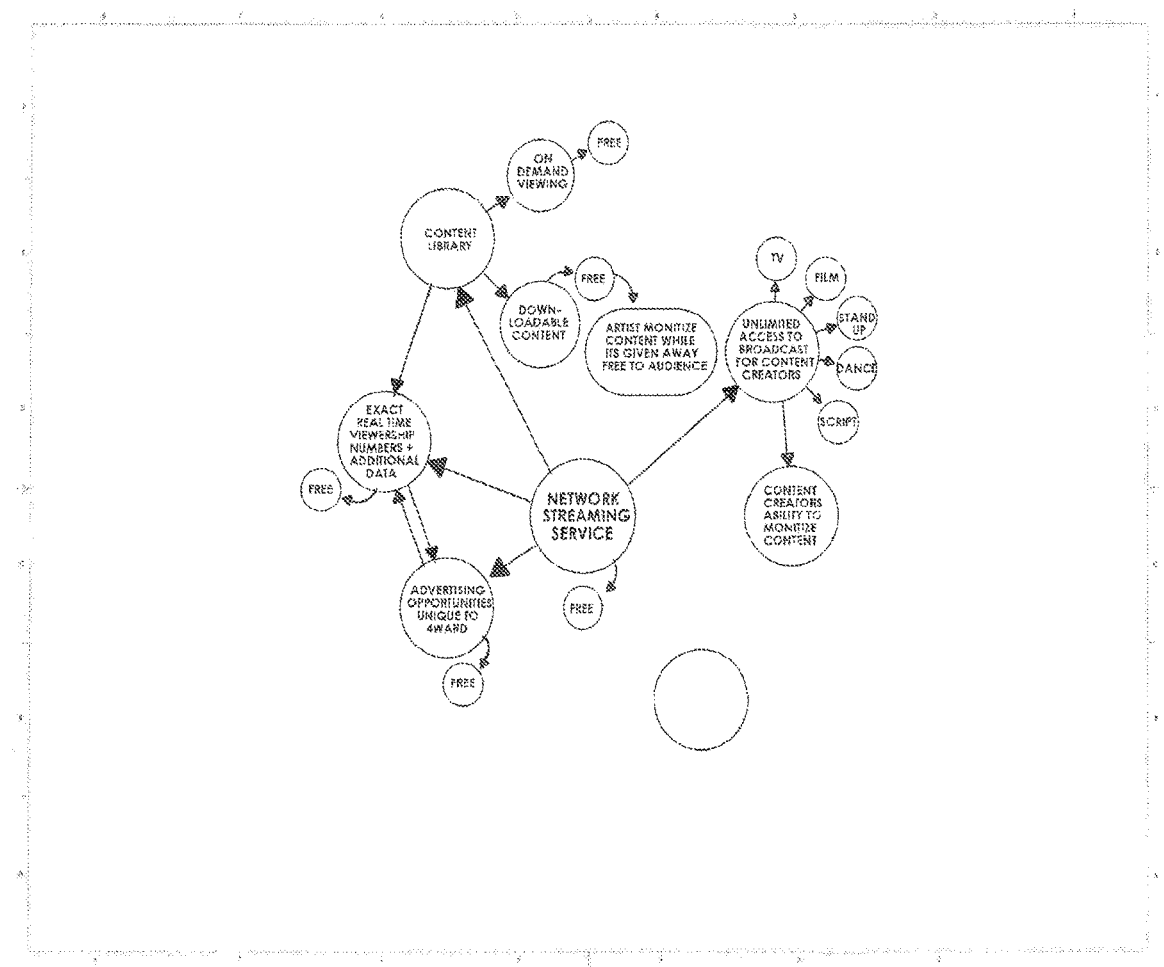

MEDIA PROCESSING METHODS AND SYSTEMS

CROSS-REFERENCE TO RELATED APPLICATIONS

This application is a continuation in part application of U.S. patent application Ser. No. 15/608,896 filed May 30, 2017, which claims the benefit of U. S. Provisional Patent Application No. 62/392,394 filed May 31, 2016, the content of which is incorporated herein by reference in its entirety.

FIELD AND BACKGROUND OF THE INVENTION

This invention relates to methods and systems for processing media. More particularly, the invention relates to systems and methods for creating a library of material, such as music or film, making such material available for viewing by distribution or broadcast, evaluation of the material, and effectively associating such material with advertising and advertisers.

SUMMARY OF THE INVENTION

The invention is, therefore, a mechanism or system whereby creators of original and other content are able to make their works available, and whereby reviewers are able to selectively view such works and evaluate them, preferably in a manner based primarily on the quality of the content or its appeal to a demographic of audiences. Preferably, the reviewers would view such work based on content alone without any knowledge as to the name or identity of the creator. Thus, in one aspect, the invention is one where the works of creators which are uploaded to server or a computer for review by others, are evaluated on their merits, thereby making it possible for lesser known or unknown creators to present their works on a more level playing field with others who may have better access to entities or outlets which conventionally distribute such works. In other words, the system and methods of the invention allow works to be evaluated primarily on content and inherent merit, and not so much on the fame or name recognition value of the creator, or personal contacts or connections that creator might have.

In accordance with one aspect of the invention, reviewers of the creative works would rate the content of such works on the merits thereof, which may include a number of parameters, and the works would be placed in a digital or computer based library or location if the reviewers considered that such works qualify for broadcast or distribution. Such a library of content would be available for access by other electronic devices including computers, smart phones and tablets to general users or subscribers. Furthermore, in accordance with the invention, the number of subscribers and their demographics would be constantly monitored by software on a central computer for the purposes of associating advertisers and advertisements with the content when viewed by a subscriber or an audience. In a further aspect, revenue derived from advertisers in this manner would be calculated by the central computer or other hardware and would, in part, be used to pay creative artists of the works so that they would directly benefit from the fruits of their creativity, preferably to a significantly larger degree than under present conventional procedures.

BRIEF DESCRIPTION OF THE DRAWINGS

The FIGURE accompanying this description represents one embodiment of the invention, shown in a schematic format.

DETAILED DESCRIPTION OF THE INVENTION

The following is a detailed description of the steps and processes involved in accordance with the media processing of the invention. It will be appreciated that there may be variations in the order of these steps, or the manner in which each of these steps is carried out, all of which will fall within the scope of the invention.

The procedures of the invention are carried out by uploading submitted material to a computer or server, and reviewing, evaluating and posting such material, according to the outcome of the process, as one or more files on the computer or server. Reviewers and others processing the uploaded material will have varying degrees of access thereto, and may move or copy the uploaded material, in accordance with security and authorization protocols, either in its original or an edited version to other parts or segments of the computer or server, or to remote computers, depending upon whether such uploaded material is considered to meet quality and/or creative standards. Other relevant material may also be uploaded to the computer or server, including advertising, broadcast schedules, numbers of viewers, to name some examples, although more examples will be identified below. Such other relevant material may be selectively combined with or associated with the uploaded submitted material in various forms and combinations, and stored on the computer or server. The computer or server may be installed with multiple types of software for gathering, analyzing and formatting information, including viewership, associated advertising, accounting software, to name some examples.

It will therefore be appreciated that the procedures and steps in accordance with the invention are all carried out on electronic hardware, including computers, servers, tablets, to name some examples without limitation, and the discussion of the various processes of the invention should be understood to take place in this context and environment.

Current Issues and Responses

It is well-established among artists that almost all avenues for distribution of creative works is controlled by large industry corporations. The challenge, especially for lesser known artists, is how to get enough exposure, and convert that exposure into income.

The invention thus attempts to isolate the best content from emerging and established creative artists, perform such works on multiple media platforms, and provide more than reasonable income to the artists. The invention provides content that is not tied to the familiar seasonal programming, which gives the audience a new season of shows starting only once or twice per year. By its nature, the system of the invention is able to deliver continually evolving top-quality content, exposing the viewing audience to potentially thousands of new artists annually in direct contrast to the familiar seasonal programming. Consistent to all of the content is the fact that it has been approved through a blind and independent review process, rewarding an audience which does not have to invest the time and energy to find such content.

Submission and Review

The process is initiated by the artist or creator of the content. The content may take many different forms, but will most often likely be film, video or music. However, other creative works including books, artwork, stand-up comedy, dance, scripts and the like may also be processed in accordance with the invention.

The artist or whomever holds the rights to the works must establish a private account, preferably through an internet connection between computers in a secured manner, within the invention, and once completed that individual will receive their I.D. number and the uploaded content will further receive a specific I.D. that is an extension of the private accounts I.D.

Upon completion of the created works, the artist or their representative would upload the content onto a receiving computer or server through the submission depository, such as through an online submission portal. Upon completion of this process, transfer of the content file, and payment, the artist may be provided with an acknowledgment of receipt, which may include an identification number and confirmation that the content has been uploaded for further review. In addition, the artist may be charged a fee, such as a nominal fee of $25-$75 for a submission, although these may be arbitrary numbers. The amount of the fee may be related to the length of the content, which will of course affect the amount of time needed to review and evaluate the submitted work, as will be described in further detail below.

Once the work has been submitted to and uploaded in the depository, the next step in the process is initiated, and this involves review of the work to assess its quality or appeal, and to determine whether the work should continue to move through the evaluation process. The nature of the review, and the parameters by means of which a work is assessed, may vary widely depending upon, for example, the work itself and the demographic to which it is directed. The following sets forth descriptions of preferred review procedures, but these may be changed or altered as determined, and still remain within the scope of the invention.

One important preferred feature of the review process is that it is "blind". By this is meant that the reviewers of the work have no knowledge as to the identity or past contributions of the creator of the work. The objective is, of course, to provide an unbiased review of the work itself without the influence of extraneous factors, such as the relative fame or obscurity of the creator, as well as contacts or connections the creator may have. The review may comprise a number of phases. In one embodiment, the first phase of the review process requires that the work or content be screened and reviewed by a multitude of review board members, typically 8 to 10 members per level as an example, which would be established in accordance with this invention. Each of these reviewers would review the work, either by accessing in an authorized and secured manner the content on the computer or server on which they are uploaded, or by copying the content to a remote device, individually and separately in this phase. Each reviewer would rate the work, making notes as may be appropriate to ensure the sufficiency and completeness of the review, and also to maintain its integrity, as well as noting their thoughts in regards to the specific piece under review moving to the next level of blind review. This may all be done completely within the confines of the central data center of the server or computer.

In one aspect of the invention, the work will be subject to three separate phases of review each by a multiple or plurality of reviewers, so that before a work or piece of content may be accepted for broadcast, to be described further below, it will have moved through and been reviewed by reviewers in these three separate blind phases, so that the result will be the combined contributions of potentially 24 to 30 members of the review board, none of whom know the creator's identity, age, race, or gender.

By utilizing at least a small multiple of reviewers, eight as an example in three separate phases, a triple blind process is carried out independently and without any of the basic current industry standard prejudices that influence the decision making process, so that the process will facilitate identification of the best material, which may then move to the next phase. In one aspect of the invention, each of these reviewers will review the work independently without reference to the others, but other variations are possible in which reviewers may, at least in one or more of the evaluation phases, work in pairs or groups of determine size which may be considered the most effective manner of evaluating the work.

A step which may be incorporated to protect the integrity of the review is to ensure that a board member cannot follow a specific piece of content, such as, for example, as it moves from one segment of the data center to another segment of the data center potentially moving to broadcast. Since all of the content, and indeed the reviewers themselves, are not identified, reviewers cannot effectively "push" any specific piece of content to the broadcast phase on his or her own. When being reviewed, the item of content has no name or other identifying information attached to it, the reviewers have no names attached to them, the reviewers notes are not attached to the content being reviewed but kept alongside the content undisclosed to any other reviewer that might review the same content, with the final notes only being reviewed at the end of the evaluation process and senior review board members actively facilitating the next steps. The content creator of a pending broadcast is notified or informed thereof, while the writing staff may also construct a letter to the content creator whose work was not accepted for broadcast informing of this result. The notes prepared by the reviewers may accompany any refusal (or even acceptance) to indicate along with encouragement that the creator consider the suggestions noted, make changes, and resubmit. Additionally, another segment of the data center computer system may require tracking of the reviewers who are evaluating any specific piece of content in order to make sure that the quality control process of reviewing content is maintained. As such, this rigorous neutrality in the review process helps to ensure that the same and best content will almost always rise to broadcast level no matter how many times it is run through the process, or indeed which reviewers from the review board pool evaluates the content.

The evaluation of the work may be based on a number of set parameters, factors or programs, which reviewers may have for guidance, and these may include: the storyline, character development, acting, direction as well as overall production quality for films and videos. In the arena of music, factors to consider in the evaluation may include: melody, harmony, rhythm, form, lyrics, and production quality. These are, of course, examples only.

Upon completion of the review process and phases described above, all content is given a final screening or listening by a majority of the review board, preferably in appropriately equipped screening rooms. The content may be screened directly from the computer or server, or copied and screened therefrom. This final screening may comprise the content which has survived and been approved through the phases described above, or it may even include some or all of the works which may not have passed muster in these initial reviews. The addition of pieces that did not pass muster may serve several purposes: it gives another opportunity to a piece of quality content that might have somehow been overlooked. Further, if it does not meet the requirements, the entirety of those attending the final screening prior to setting broadcast timing may make verbal notes as it plays, which may be uploaded and associated with the content on the server. After the final screening review, and approval of the works which have been selected for further processing, the artist or the creator of the work is contacted to inform them of the decision, and to arrange and schedule broadcast for such content. The system may require the existence of an "Artist Relations Department" for this purpose.

The selected content is then coded and processed into the broadcast management system, which may reside on another segment of the central data system, and scheduled for airing. The broadcast management systems programming functions allow for certain user preferences when using the current invention. This would, for example, allow the work to be paused, fast forwarded, rewound, and the place kept for continued future viewing. Other features such as the ability to designate the work as a "favorite" may be provided. Additionally, the user may also have the option of accessing the content from a content library which is created in accordance with the invention. The content library can be contrasted with the broadcast of the work: during a broadcast, the viewer would watch selected material and programs which are playing in real time much like one does when watching network TV. However, the same content may also be present in a content library so that the user or an audience member can access the work at any time, or perhaps start watching from the beginning, which may have been missed if the broadcast was joined only partway into the airing of the work.

In one aspect of the invention, the work, which may be a video, will be placed into a specific rotational programming cycle for a period of up to eight weeks. In other words, the work will be broadcast at over a period of eight weeks in selected time slots. The broadcast management system may keep a log of each time a piece of content airs, thereby allowing for an accurate accounting system so that calculation of payments to the artists can be effectively controlled, and accurately calculated.

In one aspect of the invention, the artist share of revenues generated by advertising during the course of the broadcast of their work may be paid within forty-five days after the content has ended its, for example, eight week or fifty-six day rotation. Rotations of shorter length may also be utilized, and payments to artists may occur on a shorter or longer schedule.

While specific numbers may vary depending upon current circumstances, generally only the top 2% of submitted content would typically be approved for broadcast. Further, that 2% would be all that runs on the broadcast system, which would be broadcasting or streaming continuously, twenty-four hours a day, seven days a week, and 365 days a year. This continuous streaming occurs on multiple channels at the same time with each channel being dedicated, in one aspect of the invention, to a specific genre. In some instances, two or more similar genres may occupy one channel.

Content Acquisition Process

With this approach, the acquisition process is able to tap into and utilize a wealth of content which may otherwise never see the light of day, and which is being created by artists who are able to take advantage of the wide array and benefits of newly developed audio and video production tools now readily available to creators. Tapping into this wealth of content enables the review board to build a vast library of works which may be broadcast, or available for viewing, 24 hours a day. Many of these works may comprise world-class content, and represent submissions filed in accordance with the present invention which are produced in their entirety by independent, non-affiliated and out of house creators and producers, and therefore represent no upfront fees and charges to the broadcast function of the current invention. The importance of avoiding upfront fees and expenses serves many purposes and is one of the more significant differences between the current invention and the current industry business model. The methods and systems of the invention therefore utilize high-quality works much of which may otherwise be ignored by the relevant industry in conventional procedures currently used for finding and publishing and broadcasting high quality works of art.

Therefore, unlike conventional TV networks and studios, the systems and procedures in accordance with the present invention risk no investment on upfront production costs of content that has yet to be created, which may or may not attract an audience. This in turn determines, of course, whether advertisers may be willing to buy advertising inventory. By tapping into a huge otherwise unserved or underserved source, the invention thereafter selects the very best from this source that is already in existence, having gone through the production process, and may essentially be ready to air.

For those submissions which have been approved by the review board, and selected for broadcast, the creators or others involved with respect to such submissions may, in accordance with the invention, be paid a majority or at least significant share of the advertising revenue. The reality of significant earnings which may be available for the creators will, in turn, most likely push the competitive bar even higher resulting in even better quality content. Furthermore, higher-quality content has a potential consequence of attracting a larger audience, and this naturally translates into higher advertising fees and revenues, which translates into higher revenue for the content creator, which translates into even higher quality content production. In accordance with the system of the invention, the persons that benefit most directly from the system are the artist themselves, who are typically underpaid and under-represented in conventional markets. But, in the broader sense, both audience and advertisers will ultimately benefit as well by the surfacing of high quality material, so this benefits all involved Programming Advertising Relationship Model The library of submitted and/or approved content in accordance with the invention may span the gamut, and include drama, comedy, action and other genres of film and video. It may also include a wide variety of music types, stand-up comedy, and dance which may be broadcast across a suite of streaming channels. As mentioned above, as submission volumes increase, and the content quality improves and rises to higher and higher levels, the number of channels in both music and film will continue to grow, thereby offering the audience more and more options, and also offering advertisers the ability to associate their product with quality materials in specific areas. Additionally, the channels and the entire system in general allow for any length piece of content. Traditionally, broadcasters fit programming into a set timed schedule. This allows them to maximize commercial time per 30 or 60 minute window of time. An example would be 30 minute TV shows which are 22 minutes in length allowing for 8 minutes of commercials. This model demands that creative content fit, which in many instances directly and profoundly affects the organic nature of the creative process by removing material to fit or adding material that is not needed in order to fill the time requirement. Further, by eliminating the timer on content combined with the current invention's ability to calculate monetization to the minute and even to the second, artists that have created brilliant works of art of mere seconds in regards to "vine" or "Instagram" can monetize those works as well.

The system in accordance with the present invention may set programming schedules for all channels, which may be much the way network television has done in the past. The viewing will be provided without any subscription fee, and limited commercials. An additional function of the inventions system is addressing and attempting to resolve digital advertising algorithm dilemmas typically faced by other streaming services. This is achieved by knowing extremely accurately how many people are watching any given channel at any particular time, together with the age, gender and location of each audience member. This information can be provided to advertisers, thereby enabling advertisers to direct their advertising dollars to a selected demographic whose parameters are known to a much more significant extent than in conventional past and current usage.

The system of the invention would also request and ask audience members to watch and give attention to commercials which are shown during the performance, and the audience may well be more amenable to watching such commercials, particularly with the knowledge that the revenues derived therefrom, or at least a significant portion thereof, will go to the artists creating the content which they are currently enjoying. There is, therefore, a mutually beneficial connection or link between the creators or artists, the audience, and the advertiser, all of which benefit from the other in a much more direct sense than has been achieved in the past. Further, advertisements may ultimately be more relevant to the specific audience, since products which have no or little relevance to the known demographic are less likely to be aired where they may be ignored or disliked. Additionally the current invention allows viewers to save ads they are interested in to their personal library account, as well as giving viewers the ability to make comments about the ad to the advertiser directly, further helping the company more accurately address their target market needs. The system also allows viewers to request additional information about an advertised product while affording the advertiser the ability to reply to viewers directly through email or other forms of communication.

The invention may also allow sharing of commercials, whereby a viewer forwards an interesting and potentially useful commercial to another. In such case, the advertiser would be notified, and may also decide to send out additional material which may be helpful to the viewer or the person with whom the commercial may be shared. When signing up, a viewer may provide an email address to which primary or secondary advertising content may be sent. Additionally, library accounts may be able to receive the follow-up advertising information allowing the user to not be concerned about their personal home email account being bombarded with advertising or unwanted information.

Advertising and commercials may be self-deleting. When content is downloaded from the library for free, the viewer must watch a specific number of commercials embedded in the content to justify or earn the free download. The advertisements would then self-delete. Or, they may not self-delete but rather turn off. In such case, if the viewer shares that content with another person, or transfers that content to another device, the advertisements would turn back on for viewing, and the same process would begin again.

In order to monetize the additional audience member, or a new device, the invention may require that the account holder register their devices. When content is shared to another device, it must be connected to Wi-Fi, or another form of connection to the services of the invention, which allows the system of the invention to observe where the content is going, and whether the device may be recognized. If the device is recognized, the charge may be for one rate. If not, the new user must register an account with the platform of the system of the invention in order to view the content. At such time, the system can notify the advertiser of additional viewing and associated charges.

The system of the invention may also comprise an on-demand component, whereby an audience member watching a currently streaming production from a TV like broadcast may further be able to access a content library so as to view such content from the library. This has multifaceted benefits. The viewer can thus watch the program whenever they want, and as many times as they want to. Further, the viewer would be able to watch from the beginning a performance which they only started watching in the middle thereof during a broadcasted stream. Further, viewers may have the ability to download the content, or send such performance or a link thereof to a friend, if it was enjoyed and the viewer believes that others may derive enjoyment as well. The performance may also be saved to a viewer's personal favorite or library file, and such performance can be watched on many devices, including mobile telephones, laptops, smart TVs, to name a few of the more common ones.

Rotational Broadcasting Mode

It should be understood individuals that view entertainment tend to have viewing patterns. An example would be someone sitting down to watch TV after dinner and watching for two hours That would be a repetitive pattern based on their life's schedule. A pattern such as the aforementioned would not have a typical viewer seeing large volumes of new content on a daily basis as the media industry as a whole is a financial model, not a model to expose large volumes of new content to viewers. This is somewhat like the automotive industry which could put hundreds of new features on next year's car but they will actually take 3-5 years to implement all those features because their business model is capital driven not giving the consumer everything they have available.

The rotational broadcast model of this current invention is the exact opposite of those models, wherein the goal is to expose as much new quality content as is available with the belief that there is always more content then could ever be shown combined with the belief that viewers ought to have access to new and different content every time they chose to take time out to view entertainment.

The current invention builds blocks of content, an example being a six hour block, (blocks can be built longer or shorter in other examples). These blocks of content have their position and rotate forward around the "clock" each day while also rotating the content inside those blocks of time each day. An example in regard to one of the channels may be utilizing eight blocks of time with six hours of content in each block filling two complete days of broadcast. Block A B C D E F G H would start with Block A beginning a broadcast at midnight and running until 6 am, then Block B starting at 6 am and running until noon and so on for two solid days or 48 hours. Then, all blocks rotate forward one location with the first block (typically Block A being moved to the end of the line following Block H in the next rotation), this time with Block B starting at midnight and running until 6 am, then Block C running from 6 am until noon with remaining blocks following in order. The next cycle has the beginning broadcast at midnight beginning with Block C. This rotating of the blocks of content allows a viewer to view the channels in their normal and consistent viewing pattern for 11 days before once again seeing the same Block of content. Additionally if the content inside each six hour block is also rotated forward one full hour each time it arrives in the initial broadcast position, it creates a dynamic such as when the viewers' consistent pattern has them viewing when Block A comes back into their patterned viewing time, the order of the content has changed affording the viewer the opportunity to see content in that six hour block they might not have previously seen. This means that if a viewer watches one hour of programming per night, it could take up to 60 days to see all the content offered in the initial eight 6 hour blocks of content. Broadcast may be effected by, for example, streaming content on-line or transmitting content by other conventional means.

Access and Funding

It would be well known to artists, whether musician, writer, director, actor, producer or other, that large industry corporations generally control almost all of the avenues of distribution and therefore play a huge part in deciding what works may reach the public and which do not. The vast majority of artists are excluded. While easily accessible technology has enabled a new generation of artists to produce broadcast-ready content from their own homes or small studios, whether film, television or music, the promise of an Internet that would offer an additional platform for mass exposure to small content creators giving them the ability to monetize that content remains a substantial challenge. This may apply to both unknown and even known artists in their ability capture an audience. Therefore, the driving issue for many artists is how to get enough exposure, and thereafter convert that exposure into revenue.

Indeed, with the wide array of media choices across multiple devices and platforms now available, it is challenging enough for multibillion-dollar advertisers to reach consumers, let alone smaller artists, regardless of the quality of the content. On the other side of the coin, finding high quality and brilliant material for viewing is equally challenging, requiring an audience to wade through an almost infinitely large sea of average or even mediocre material to discover the gems contained therein.

The invention thus provides a system which features a suite of channels broadcasting very high quality content from both emerging and established writers, directors, recording artists and others that have passed through a review process broadcasting only the best of the best content and making this content available to the public across multiple media platforms and through many types of digital devices. At the same time, a reasonable source of income is provided to the artists that potentially exceeds any currently available, especially for unknown or little-known artists.

One of the main financial advantages to artists whose content is utilized by the current invention is that the amount of revenue they can generate is tied to the advertising rates which move upward with an increase in viewership. Traditionally, artist negotiate a set rate for licensing their broadcast ready content to be utilized by a network. The network then works to maximize advertising revenue for spots sold inside that licensed content. The network may generate many multiple times more revenue than it paid for the rights to broadcast the content.

The invention offers creative content across all genres the opportunity for broadcast, and also the same or comparable financial arrangements available to current producers for bringing broadcast ready media to the major networks. It is emphasized that selection in accordance with the invention is based on the quality of content alone.

The invention provides a broadcasting model affording an eloquent blend of network, streaming and on demand services available on multiple platforms. This follows from the combination of how it delivers the content, how it sets a programming schedule, and that it has a content library. Content producers are able to harness the power of the system of the invention, and audiences are able to enjoy top-quality entertainment from already discovered and previously undiscovered talent without having to spend valuable time searching. The review process of the present invention helps to identify the highest quality submissions, without prejudice. Finally, advertisers are able to gather extremely important viewer data in up-to-the-minute real time, which is more accurate than any other distribution channel in the industry. By requiring viewers to establish an account, and then further requiring subscribed viewers to utilize their pass code to access any of the channels, the current invention is uniquely positioned to know exactly how many people are on each channel at any given time, specifically what each viewer is watching, the general location of the viewer, as well as the age, race, and gender of the viewer. All of these features are what advertisers are unable to access presently and desperately need in order to better direct their advertising campaign spending.

A typical network or conventional broadcaster utilizes capital resources at the front end either to create content, license it, or buy it. Expenditures may then be recouped through advertising revenues. However, there are built in risks. If the content is not popular, the advertising rates are low, and this just simply encourages entertainment companies to remain with previously proven artists and creators, take less risks, and work safely for revenue streams so that they may be secure in efforts to recoup their overheads. The system of the present invention eliminates or substantially reduces the aversion to risk, as there would be no capital expenditure upfront for content creation or acquisition. The invention provides a review as described above for sifting through large amounts of material to identify the best. The objective is that quality will prevail above all else.

It will be appreciated that in an entertainment industry which includes about 700 cable channels, hundreds of network channels, dozens of streaming channels, and countless free channels, certain things remain consistent: (1) the manner of monetizing content; (2) the manner of collecting the content; and (3) the manner in which the content is controlled. The constantly changing factor is how the content is delivered. Thus, faster downloads, more definition, medium of use (TV, computer, phone, gaming console and the like), contract or no contract, grouping, are constantly evolving in an effort to meet changing needs. There are probably more than 100 million households with cable TV, approximately 70 million have Netflix, and there are many other choices in addition. All these options guarantee two things. First, many avenues for commercials, and second, much sifting through volumes of content to find quality. Additionally it is equally as difficult for advertisers to find a market across such diverse viewing options. The system of the current invention provides an independent and "blind" review process which elevates quality content to the top for distribution and broadcast.

Advertisers have information relating to audiences in real time, and, importantly, the creative artists are able to enjoy substantial returns from their creations. Broadcasting is funded by content submission fees, thus the artists are supporting a platform that can in return support the artist. Advertising revenue and the rate of that revenue is directly related to the number of viewers. The number of viewers is determined by the quality of the content. As the content quality is discovered, the viewership will rise, hence the advertising revenue will rise, hence the revenue to the artists will rise, even more substantially due to overhead costs being covered by submission fees.

Advertising rates in accordance with the invention may be calculated by a mathematical equation, for example, based on the cost for each thousand people viewing a specific show. A specified amount of money would be charged on this basis. Rates may move higher or lower based on the time of the day, or even the day of the week. This calculation can be scaled down to know the per minute or even per second amount of ad revenue so as to more accurately compensate content creators. The ability to scale down to the second allows for the "timer" on content length to be removed. The "timer" is the length of time content must be to fill or conform to the traditional broadcast advertising model. Such a model directly impacts the original and organic nature of creating content for entertainment purposes.

Additional Description and Discussion (A) Embedded commercial content in free downloadable content self-deletes or turns itself off after a set number of views. Current content (music, video, or film) is downloadable from a variety of sites for a small fee. The content "libraries" garner a minority share of the download fee and also sell advertising space on the pages of the library to generate more revenue.

(A1) In the present invention, the content library (invention) has many functions, including that it allows for all of the content to be downloaded for free while still paying the content creators more than they generate from conventional libraries. This is accomplished by placing advertisements at the beginning, middle or end of the downloaded content. Such advertisement (or ads depending on the length of the content downloaded) self-deletes or turns itself off after the content has been viewed a set amount of times. These advertisements generate revenue for the creator and the library.

(B) On demand ability may be linked directly to scheduled programming. Currently, "on-demand" services consist of a content library of a particular network's past shows, or a standalone service that holds thousands of content titles of past shows and films. The on-demand service itself allows viewers to access these titles for free and actually view some of them for free. However, the majority of these titles cost the viewers several dollars to view. The chosen content with fees attached allow the viewers to watch as much as they wish over a twenty-four hour period.

(B1) In the present invention, viewers can go from watching a show they turned on in the middle to watching that exact content in the library with the click of an icon. There, they can read notes, save for viewing later, start watching from the beginning, or leave review notes for other viewers. A fair comparison would be, for example, turning on ABC channel 7 in the middle of a show and clicking on an icon to reach ABC's content library and being able to do all the aforementioned options. An audience member can start watching a show on one of the channels that began before they joined, and they can activate an icon (or use some other procedure) on the screen and be taken to that exact show in the content library where the viewer has several options available. These include: (1) begin watching from the beginning, (2) "favorite" the show (which places it in their personal content library) for viewing later, (3) read notes on the show from those involved in its creation, (4) eventually leave their own comments after watching it, (5) have full control of the content. In this regard, several current cable channels allow a viewer to select the "start over" function and the show starts over. However, the viewer is unable to fast forward, rewind, or pause for an extended period of time. In comparison, therefore, this is not full control for the viewer.

(C) Advertising, with network TV, the Nielson rating system is the standard. The system uses a small cross section of households that have a viewership box in their house which tracks what each household is watching, including times, channels etc. All of that data is then extrapolated out to a number that Nielson dictates covers the entire country, which is then considered to be what the country is watching en mass. Advertising rates are then based on those numbers. Advertisers currently pay for an ad campaign and get a report after their entire campaign is completed, and after they have spent their advertising dollars. Only at this time do they get to see if their ad campaign achieved the desired results. The main problem with the Nielson model is there are only about 40,000 homes with Nielson boxes capturing this information and about 118,000,000 homes with TV's. Essentially, about 0.00337% of the viewing public's viewing habits are being used to calculate what the remaining about 99.99662% of the public is supposedly viewing.

(C1) In the present invention, each channel is programmed and it is known what is playing, much like a network. However, because the invention utilizes a streaming service, it may be required that viewers establish a personal account which assigns them a personal access code. That code must be used each and every time a viewer wishes to access the channels. In a preferred form, the only personal data required is age, gender, and zip code. With this data, it is possible to offer data to advertisers in real time as to exactly how many people were on a certain channel when their commercial was run, and, what the age, gender, and zip code of those people may be. For a company advertising in a local market, it can also access other local markets in their region, or any other region in the country. This real time data (which may be accessed through an account right after a commercial airs to see the aforementioned numbers) allows for adjustments to an advertiser's marketing strategy as well as seeing numbers from other localities in their region to see if expansion makes sense in an educated manner currently unavailable in the advertising industry. In accordance with a feature of the invention, advertisers can adjust their ad campaign in the midst of their ad campaign, greatly improving the success rate of their specific goals.

(C2) Additionally, through the library, all commercials can be accessed later by viewers that are of interest but for which there was no way to record or write down the information in the moment. By clicking on the "favorite" icon while the ad is on the screen of their device, the commercial may be saved to their personal library account and may further notify the advertiser of the viewer interest so they can email information to the viewer.

(C3) Another function available to advertisers is the "preload immediate drop" process. This process allows advertisers to set "marker" numbers that trigger advertising buys and placements into broadcast rotation. An advertiser in the Dallas area, for example, may be interested in expanding into additional local markets but only wants to spend additional revenue if they can reach a certain minimum number of viewers. The advertiser can set the minimum number, set the markets they are interested in, and set their budget. When those set numbers in any or all of the additional markets are achieved, their advertisement is placed in broadcast rotation for viewing. This allows an advertiser several specific advantages: (1) It lowers the risks typically associated with buying ads based on current viewer numbers, numbers that may not be relevant or current at the time that advertiser's ad actually runs. This risk lowering process is directly related to the overall ability to know exactly how many people are viewing each channel in every city across the country and beyond our borders. (2) Allows advertisers to "test" new markets and/or new ad content in the "now" as compared to months out waiting to be scheduled into rotation as is the current method. (3) Allows advertisers to monitor immediate results and configure their longer range ad buys based on real time numbers by potentially running multiple ads at once for comparison affects and results. This is in contrast to the current methods which force advertisers to buy ad time in bulk for placement over a set time frame with the results of the entire ad buy coming after the campaign is completed. This is essentially a system that increases financial risks to the smaller advertiser. Hopefully, the ad they ran was the better of the two or three they had produced to choose from, but there is no upfront certainty.

(D) Getting Content to Broadcast: The current way for an artist to get any form of creative content to air may be as follows. In, for example, the case of a film, first the script must be written, then funding must be found in order to begin pre-production. In order to get funding, one has to have a successful track record of past works. If not, the creator may have to beg and borrow from friends and family and that will likely not cover anything larger than a short film at best. Even if the creator were able to raise enough capital to produce a full length feature, a distribution and broadcast outlet will be needed. In order to get distribution, the creator requires connections, a manager or agent, but again a successful track record often controls the acquiring of these connections. Since the industry spends large amounts of capital on every part of the creative process, they tend to go with proven success, which often has nothing to do with quality. Since the distribution process requires a vast amount of money to advertise and market a product, it is extremely difficult for an independent artist to get support or backing from a distribution or broadcast company. If lucky enough to get that far, the artist typically gets the smallest portion of the profits if there are any reported. Not only are funds required, but there is also the fact that the number of "slots" available for viewing is not unlimited. Several decades ago, films stayed in theatres for about 2-3 months. Today, a few weeks is a long run before a film is replaced by the next one. On TV/cable shows, there are endless re-runs, filling time on channels. While the broadcasters sell ad spots at a premium, they may pay less for older content that is a safe known quantity that will attract an established viewership. Even though the spots are limited, the owners of channels do not want to spend dollars "risking" on unknown content because of the costs associated with it and the fact that they charge for their services. If they are publicly traded, they need to produce results for shareholders and hence the ability or desire to "risk" diminishes dramatically. If an artist does get a distribution, he or she may typically generate almost zero return as the company will argue that the profits went to the costs to market the works. On the other hand, if the content is a huge hit, then the artist may get better returns, but typically on the next project they create and then only through negotiations supported by previous history.

(D1) The procedure in accordance with the invention is very different from the above. Assuming an artist has gone through the creative process and now has finished content ready for distribution or broadcast, the artist can submit such finished content in accordance with the invention for a minimal fee and that content then goes through a review process, as described above. If the content makes it all the way to broadcast, it may have been reviewed by no less than 24-30 industry professionals. (There may also be non-professionals enlisted to review content.) None of those professionals have any money involved, have any reputation involved, nor do they know anything about the content's creator. Names are reduced to codes, reviewers names are also reduced to codes, reviewers may be required to make notes on the content, but other reviewers may not have access to those notes. Thus, all aspects of the review process are blind and independent. Additionally the age, race, gender, social status, and creative track record are also blind to everyone in the review process. This means having an agent or manager to get a door to open is no longer required, being "young and fresh" is no longer required, being thin and attractive is no longer required. All that is required is quality content. Additionally, artists that want to create a feature length film (the most expensive to accomplish) can submit a trailer for review. If the trailer moves through the process all the way to broadcast, the invention provides that it may run on a "trailers" channel for interest. Furthermore, the system may allow viewers of the trailer to invest in getting the film made, such as through crowd funding. One aspect of the invention allows for the artist to raise capital to continue the project, such as by issuing a letter of intent to broadcast to the artist based on the quality of the trailer submitted.

(E) Monetization of Creative Content: In the current environment those that create content, whether it is film or TV or music or other content, there is an understanding that those that create get the smallest portion of the funds generated by the created content. Distribution companies have massive overhead as described earlier and utilize that line of reasoning to justify the smallest portion going to the creator of the content. Distribution and advertising can be extremely expensive because there is no way of really knowing how to find the audience. Thus, the distribution companies assume they are taking the biggest financial risk.

(E1) In accordance with the present invention, the space or spots for distribution and broadcast are limitless due to the scalable nature of the format. Being a streaming service allows the addition of channels when needed at minimal or relatively low cost. Because of the unconventional marketing in accordance with the invention, the costs are significantly lower than conventional forms of marketing. The process of the invention does not need to charge extravagant prices, since good content in and of itself attracts viewers. No charge for quality attracts viewers which raises advertising rates, which in turn generates more revenue for content creators. Good content which attracts viewership also attracts advertisers. Thus the current invention systems allow each of the three external components, namely, (1) the artist, (2) the audience, and (3) the advertiser, to support the others while at the same time benefitting from the others.

The invention claimed is:

1. A system for the handling media content comprising a central server performing
    a plurality of functions and processes all being directed by
        a computer programming inserted into the central server such that a functional platform is established that allows a content creator to pay a fee and submit a piece of content to be reviewed by an employee of the platform for consideration of placement on the platform and eventual broadcast to at least one registered user of the platform to view, placement on the platform and broadcast wherein at least 50% of the revenue generated from advertisement sales are paid to the content creator;

the system providing a no charge policy for registration and access to the platform for a user to,
  A) view a preprogrammed suite of channels broadcasting the content and ads,
  B) access a content library for self-serve choices of streaming content to view, and
  C) download content from a content library to own for free through a no cost download policy;

the system providing permissions for an advertiser to utilize the platform by placing advertising and to access an exact number of users watching the advertising as it is being broadcast in real time along with access to a data file of specific non personal information comprising age, gender, and zip code, relating to each user watching the advertising, data which is required of the user to join the platform, the information being accessible through an advertiser platform account.

2. A system as claimed in claim 1 further comprising calculating the running length of a piece of content that is available for free download to determine the number of times an ad embedded in the content is to be played before the advertisement turns off by a program coding embedded in the content.

3. A system for handling media content as claimed in claim 1 comprising three advancing levels of review each having multiple employee members, each of whom reviews the material from a secure data center independently and makes a qualitative evaluation.

4. A system for handling media content as claimed in claim 1 comprising the further step of logging the length of each piece of content each time it is broadcast in a particular block of broadcasted content, and calculating an amount of advertising revenue paid to the system by advertisers relating to all the advertising broadcast in that particular block of broadcasted content for establishing payment amounts due to the content creators whose content was broadcast in that particular block of broadcasted content.

5. A system for the handling media content as claimed in claim 1 wherein registered users of the system are able to download content from the content library on the central server to a personal computer or device at no cost to the registered user while generating revenue for the content creator from advertisements embedded in the content.

6. A system for the handling media content as claimed in claim 1 wherein an embedded advertisement is turned off or disabled via programmed coding embedded with the advertisement in the content after the advertisement has been viewed a pre-determined number of times.

7. A system for the handling media content as claimed in claim 6 comprising tracking content downloaded by a registered user when that content is shared with another device, and verifying that the secondary device is registered with the platform before allowing the content to play, if not registered the secondary device will be directed by a prompt to register with the platform.

8. A system for the handling media content as claimed in claim 1 wherein advertisers can utilize the statistical analysis of users on the platform watching the advertiser's current advertisement along with the user's specific non personal information in future advertising strategies.

9. A system for the handling media content as claimed in claim 1 wherein a creator of a dance routine can monetize this form of creative content in the same manner as the creator of other types of content.

10. A system for the handling media content as claimed in claim 5 further wherein content creators who are scriptwriters have the ability to place their written works in a script portion of the content library with an anonymous ID code associated with the creator, allowing agent, manager, producer, and directors to search the content library for a quality script, with no ability to copy or download content, interest in a script being directed to the platform for contact information of the anonymous content creator.

11. A system for the handling media content as claimed in claim 5 further comprising access for users of a platform to download at no cost, visual art content including a photograph, a painting, or a computer generated image, to own while generating revenue for the content creator.

12. A system for the handling media content as claimed in claim 1 wherein creative content submitted to the platform requires no upfront acquisition costs on the part of the platform.

13. A system for the handling media content as claimed in claim 1 wherein the users of the platform can compile a block of content and consume the assembled block of content at a time convenient to the user.

14. A system for the handling media content as claimed in claim 1 wherein a block of content has a position in a daily broadcast timeline that is rotated forward in the timeline each day at the same time, individual content within each block of content is also being rotated forward each day.

15. A system for the handling media content as claimed in claim 1 further comprising an ability to increase or decrease broadcast capabilities on a daily basis by a process of adding or subtracting channels on the platform to accommodate the amount of submitted and accepted creative content being made available for broadcast.

16. A system for the handling media content as claimed in claim 1 comprising the creation of additional channels, each channel being utilized for a specific genre of content, additionally having a series of content length specific channels.

17. A system for the handling media content as claimed in claim 1 wherein registered users of the platform are able to contact content creators in a direct manner through their personal user account.

18. A system for the handling media content as claimed in claim 1 wherein users of the platform have an option to vote on favorite pieces of content watched, wherein the content with the highest votes may be given an award, and a future rebroadcast opportunity.

19. A system for the handling media content as claimed in claim 1 wherein users can save commercials considered interesting to a personal account, request information from advertisers relating to an advertisement, and receive information from the advertiser, from a user's personal account on the system.

20. A system for the handling media content claimed in claim 1 wherein users of the system are able to contact content creators directly through an individual user account to the content creator's personal user account.

21. A system for the handling media content comprising a central server performing a plurality of functions and processes all being directed by computer programming inserted into the central server such that a functional platform is established that allows a content creator to upload a piece of content to one portion of the platform, pay a submission fee, have a review of the content performed by an employee of the platform, whereby if the submitted content passes a multiple of platform employee review stations the content is then moved to another portion of the platform where the content is accessible for user viewing through multiple platform functions being, on a multitude of preprogrammed channels, in a content library for the streaming of user chosen content, and downloadable from the content library to the user's media device.

22. A system for the handling media content comprising a central server performing programming inserted into the central server such that a functional platform is established that provides a no charge policy for registration and access to the platform for a user, the user through a no charge download policy can download content held in the library to own, the users downloading free content generating a revenue stream for the creator of the downloaded content from the advertisements embedded in the content.

23. A system as claimed in claim 22 a further comprising embedding advertisements in content accompanied by embedded program coding, the coding determining when the advertisement turns off once the program has established the pre-determined number of advertisement views has occurred.

24. A system for the handling media content comprising a central server performing a plurality of functions and processes all being directed by computer programming inserted into the central server such that a functional platform is established that allows users to join and access the platform at no cost,
- a piece of submitted content to go through a review process and if accepted be moved into a content library which offers that content to a user of the platform to download and own through a no cost download policy in exchange for watching an advertisement embedded in the content,
- the content further being embedded with a programmed coding specific to counting the number of times the advertisement has been viewed, and when a predetermined number of views has been achieved the embedded programmed coding hides the advertisement in future viewings of the content on the device by the user,
- a revenue amount paid to the platform from an advertiser to have their advertisement embedded in the no cost piece of downloaded content which is divided between a content creator and the platform with at least 50% of the revenue going to the content creator.

25. A method as claimed in claim 24 wherein the computer coding embedded along with an advertisement in a piece of content tracks the number of times the content was played and identifies when the content is shared to a secondary media device, whereupon the computer coding turns the advertisement back on for viewing a pre-determined amount of times on the secondary media device before the advertisement turns off.

26. A system as claimed in claim 25 wherein the embedded computer determines when the content is shared to the secondary media device, if that secondary media device is registered with the platform and if not registered with the platform display a notice on the device instructing the user of the device to register with the platform to view the content on the device.

27. A system as claimed in claim 26 wherein the embedded computer coding informs the platform when the secondary device registers with the platform a piece of content that was downloaded by another user is now on the secondary device, the platform then logs the number of advertisement views required for the specific piece of downloaded and transferred content to become advertisement free on the secondary device, and places that information into the advertiser's platform account detailing the additional views and additional revenue that will be billed to the advertiser as well as logging in the additional revenues due to the creator of the content transferred to the secondary device.

28. A system for the handling media content comprising a central server performing a plurality of functions and processes all being directed by computer programming inserted into the central server such that a functional platform is established that allows an advertiser the ability to access a constantly updating data report on the number of users watching the advertiser's advertisement as it is being broadcast in real time, along with access to a user data file of specific non personal user information comprising age, gender, and zip code, relating to each user watching the advertisement,
- the user data file information being required from the user to register with the platform, the platform then assigning the user a personal user ID code, the inputting of the user ID code being required each time the user accesses the platform.

29. A system for the handling media content comprising a central server performing a plurality of functions and processes all being directed by computer programming inserted into the central server such that a functional platform is established that allows an employee of the platform to perform a review process on a piece of submitted content to determine if the content will be accepted for broadcast and viewable by a user of the platform,
- the review process configured such that a content creator's personal information, while always attached to the content, is converted into an anonymous ID code during the review process, the ID code being the only identifiable markings available to at least one employee reviewing the content,
- the employee reviewer has their personal identity converted to an anonymous ID for the review process, for anonymity to other employee reviewers,
- the review process allows each piece of content to be transferred through a multiple of review station levels with each employee reviewer at each station level of the review process not knowing the name of the creator of the content nor the name of the previous employee reviewer, the anonymity of the content creator and employee reviewers eliminating potential biases from the process based on the content creator's name, age, race, or gender,
- content reviewed and approved for addition to the platform for broadcasting has the content creator's ID converted back to their name when cataloged on the central server and visually available to users.

30. A system as claimed in claim 29 wherein the system compiles each employee reviewer's review notes for monthly performance evaluations.

31. A system for the handling media content as claimed in claim 29 wherein submission of the content is via an Internet website, and further comprises the process of content creators paying a submission fee for review of the content, the review process utilizing a specific portion of programming software on the computer or server.

32. A system for the handling media content as claimed in claim 29 further comprising the process of a last chance review of content not accepted after the initial multiple levels of reviews, if the content reviewed had achieved a minimum acceptable score through those initial reviews.

33. A system for the handling media content as claimed in claim 29 wherein content not selected on the basis of the platform's multi-level review process, receive written feedback from the compiled platform employee reviewer's notes.

34. A system for the handling media content comprising a central server performing a plurality of functions and processes all being directed by computer programming inserted into the central server such that a functional platform is established that allows a content creator who has submitted content to the platform, the content having passed a review process, to be added to the platform for broadcast for user viewing, to share in a revenue stream the platform generates from selling broadcast airtime to advertisers and then broadcasting advertiser's advertisements, the platform retaining no more than 50% of the overall revenue advertisers pay the platform to broadcast their advertisements, and the content creators retaining at least 50% of the overall revenue advertisers pay the platform to broadcast their advertisements.

35. A system for the handling media content comprising a central server performing a plurality of functions and processes all being directed by computer programming inserted into the central server such that a functional platform is established that allows a user of the platform the ability to choose from a multitude of preprogrammed channels, users accessing the platform and viewing content mid-broadcast on one of the multitude of preprogrammed channels can select an icon on a media viewing device and transition to a content library to start viewing the content from the beginning, and mark the content for later viewing on a personal library account, or selectively download the content at no cost.

36. A system for the handling media content comprising a central server performing a plurality of functions and processes all being directed by computer programming inserted into the central server such that a functional platform is established that allows:
  1) a creator of content with or without representation or a history of creating broadcast quality content to submit content to the platform by establishing an account with specific non personal information comprising age, gender, and zip code,
the system then generating a user ID code which is attached to each piece of content the creator uploads to a submission portion of the platform,
a platform employee reviewing the submitted content through a multiple level blind review process wherein the content creator is only identifiable by the user ID code during the review process,
the employee reviewer only being identifiable by an individual ID code, the review process removing biases based on the age, race, gender, or notoriety of a content creator;
  2) the piece of content that has passed the review process and been moved to a broadcast portion of the platform to be cataloged into the system where the content is accessible for user viewing through multiple platform functions being,
on a multitude of preprogrammed channels,
in a content library for the streaming of user chosen content, and downloadable from the content library to the user's media device;
  3) the suite of channels for broadcasting of content being able to increase or decrease the number of channels as subject matter categories of content and volume of content expands or contracts;
  4) a process of rotating blocks of content incrementally forward on a 24 hr clock, and additionally rotating the content within each block of content incrementally forward, allowing all pieces of content within each block of content to have been played at every time slot of a 24 hr day by the end of a 28 day rotational cycle;
  5) a process of paying content creators at least 50% of the total advertising sales revenue generated by advertisements broadcast inside the block of content their content was placed;
  6) an embedding of advertisements inside of content downloaded from a no cost content library that turns off after the advertisement has been viewed a set number of times, a programmed coding also embedded in the content places the advertisement into hidden mode when the advertisement has been viewed a predetermined number of times, the embedded advertisement allows the downloaded content to be downloaded at no cost to the user of the platform while generating revenue for the content creator;
  7) a requirement for users joining the platform to establish an individual user account by inputting age, gender, and zip code, the platform using the inputted user data to generate an individual user ID code that must be used each time the user accesses the system; and
  8) a process that identifies the exact number of users viewing each advertisement as it is broadcast on each channel by tracking the user's ID code and making that information accessible to the owner of the advertisement through the advertiser's platform account while their advertisement is being broadcast in real time along with the specific non personal information comprising age, gender, and zip code of the users viewing the advertisement.

37. A system for the handling media content as claimed in claim 36 comprising a revenue sharing model and that calculates advertising revenues collected from broadcasted advertisements placed into blocks of content, divides the total revenue amount by the number of minutes within a specific block of broadcasted content, assigns a dollar amount to each minute of the broadcasted block of content, and pays more than 50% of that revenue to the content creators based on the amount of minutes each content creators content was broadcast in that block of content.

* * * * *